United States Patent
Fujimoto

(10) Patent No.: US 11,282,377 B2
(45) Date of Patent: Mar. 22, 2022

(54) VEHICLE, ROADSIDE APPARATUS, COMMUNICATION APPARATUS AND TRANSPORT COMMUNICATION SYSTEM

(71) Applicant: KYOCERA Corporation, Kyoto (JP)

(72) Inventor: Shinobu Fujimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/133,915

(22) Filed: Dec. 24, 2020

(65) Prior Publication Data

US 2021/0118287 A1    Apr. 22, 2021

Related U.S. Application Data

(63) Continuation of application No. PCT/JP2019/024935, filed on Jun. 24, 2019.

(30) Foreign Application Priority Data

Jun. 27, 2018   (JP) .............................. JP2018-122516

(51) Int. Cl.
   *G08G 1/01*      (2006.01)
   *H04W 4/44*      (2018.01)
   *G07C 5/00*      (2006.01)
   *G08G 1/00*      (2006.01)

(52) U.S. Cl.
   CPC ............ *G08G 1/0116* (2013.01); *G07C 5/008* (2013.01); *G08G 1/20* (2013.01); *G08G 1/22* (2013.01); *H04W 4/44* (2018.02)

(58) Field of Classification Search
   CPC .......... G08G 1/0116; G08G 1/20; G08G 1/22; G08G 1/164; H04W 4/44
   See application file for complete search history.

(56) References Cited

U.S. PATENT DOCUMENTS

2020/0055498 A1*  2/2020  Higuchi ................. G08G 1/017

FOREIGN PATENT DOCUMENTS

| JP | 2004352175 | * 12/2004 | ............... G08G 1/13 |
| JP | 2011-227724 A | 11/2011 | |
| JP | 2016-177638 A | 10/2016 | |

OTHER PUBLICATIONS

ARIB STD-T109 Version 1.3 published on Jul. 27, 2017.

* cited by examiner

*Primary Examiner* — Hongmin Fan
(74) *Attorney, Agent, or Firm* — Studebaker & Brackett PC

(57) ABSTRACT

A vehicle that performs communication with a roadside apparatus installed in a roadside of a road at least, the vehicle includes a communicator configured to transmit a message including an information element indicating whether or not one or more towed vehicles are towed by a towing vehicle.

9 Claims, 4 Drawing Sheets

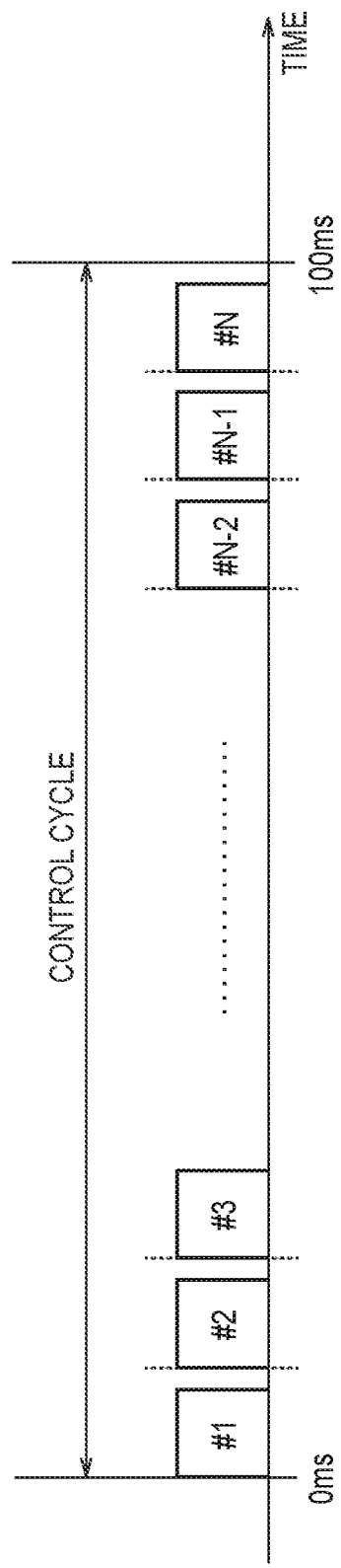

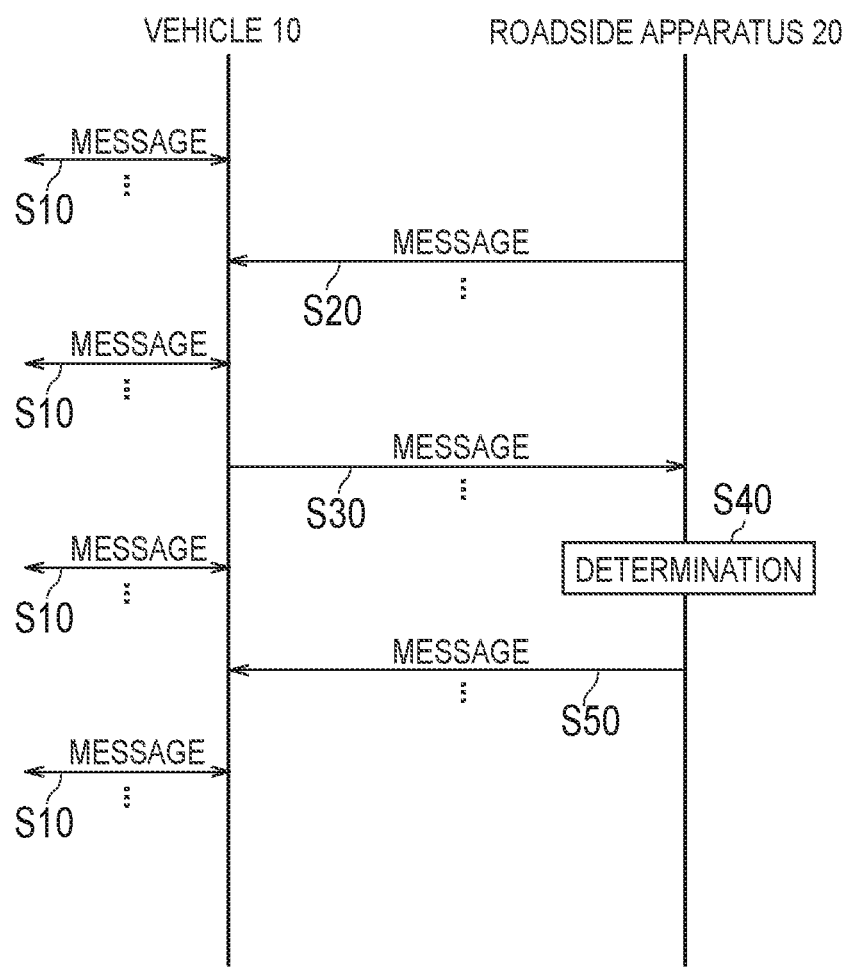

VEHICLE, ROADSIDE APPARATUS, COMMUNICATION APPARATUS AND TRANSPORT COMMUNICATION SYSTEM

RELATED APPLICATIONS

The present application is a continuation based on PCT Application No. PCT/JP2019/024935, filed on Jun. 24, 2019, which claims the benefit of Japanese Patent Application No. 2018-122516 filed on Jun. 27, 2018. The content of which is incorporated by reference herein in their entirety.

TECHNICAL FIELD

The present invention relates to a vehicle, a roadside apparatus, a communication apparatus, and a transport communication system.

BACKGROUND ART

Conventionally, in a high-degree transport system (for example, ITS; Intelligent Transport System), a technique that communication between a roadside apparatus installed at a roadside of a road and a vehicle is performed is proposed (for example, Patent Literature 1).

CITATION LIST

Non-Patent Literature

Non-Patent Literature 1: The Association of Radio Industries and Businesses, "700 MHz BAND INTELLIGENT TRANSPORT SYSTEMS ARIB-STDT109 version 1.3", [online], Jul. 27, 2017 [Jun. 22, 2018, search], Internet 153083234195_0.html

SUMMARY OF THE INVENTION

A vehicle that performs communication with a roadside apparatus installed at a roadside of a road at least, according to a first disclosure, includes a communicator configured to transmit a message including an information element indicating whether or not one or more towed vehicles are towed by a towing vehicle.

A roadside apparatus that is installed at a roadside of a road, according to a second disclosure, includes a communicator configured to receive, from a vehicle, a message including an information element indicating whether or not one or more towed vehicles are towed by a towing vehicle.

A communication apparatus that is installed at least any one of a roadside apparatus installed at a roadside of a road and a vehicle performing communication with the roadside apparatus, according to a third disclosure, includes a communicator configured perform communication of a message including an information element indicating whether or not one or more towed vehicles are towed by a towing vehicle.

A transport communication system according to a fourth disclosure includes a roadside apparatus installed at a roadside of a road and a vehicle performing communication with the roadside apparatus at least. The vehicle includes a communicator configured to transmit a message including an information element indicating whether or not one or more towed vehicles are towed by a towing vehicle.

BRIEF DESCRIPTION OF DRAWINGS

FIG. 4 is a diagram illustrating road-to-vehicle communication according to an embodiment.

FIG. 5 is a diagram illustrating a transport communication method according to an embodiment.

DESCRIPTION OF EMBODIMENTS

In a high-degree transport system described in BACKGROUND ART, a case where a towing vehicle tows one or more towed vehicles is assumed. In such the case, inventors have found out that there is a need to identify a convoy of vehicles including the towing and towed vehicles, to make the convoy of vehicles including the towing and towed vehicles run properly.

The present disclosure provides a vehicle, roadside apparatus, communication apparatus and transport communication system possible to identify a convoy of vehicles including a towing and towed vehicles.

In the following, the embodiments will be described with reference to the drawings. Further, in the following description of the drawings, same or similar parts are marked with same or similar signs.

However, it should be noted that the drawings are schematic and ratios of each dimension or the like may be different from actual dimensions. Therefore, specific dimensions should be determined in consideration of the following description. In addition, it is needless to say that portions having different dimensional relationships or ratios is included between the drawings mutually.

Embodiments (Transport Communication System)

Figure 1:
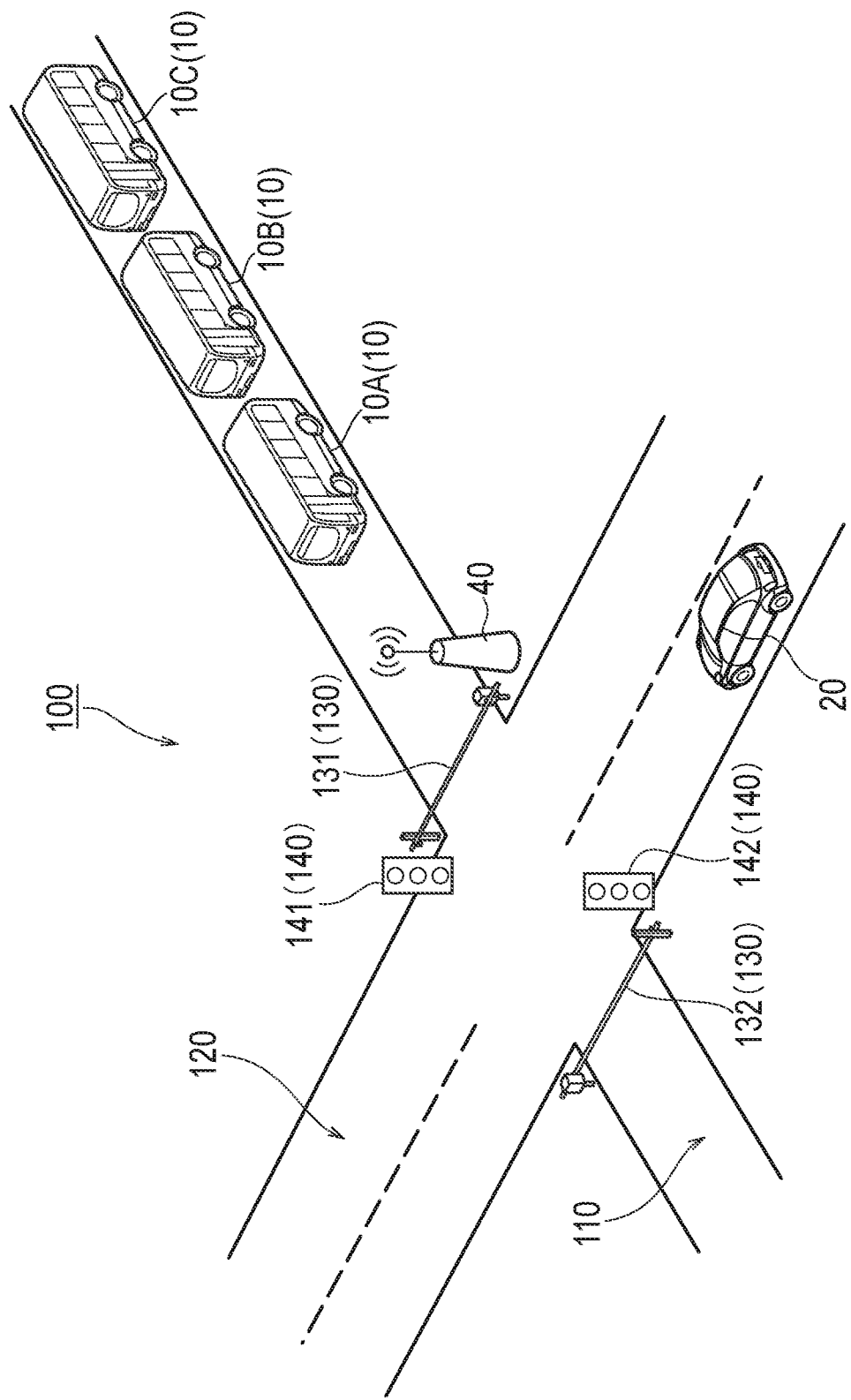
FIG. 1 is a diagram illustrating a transport communication system according to an embodiment.

In the following, it will be described about a transport communication system according to the embodiments. In the embodiments, as illustrated in FIG. 1, it will be exemplified about a case where a road 110 and road 120 intersects. Here, it is assumed that the road 110 is the way for a vehicle 10, and the road 120 is the way for a vehicle 20. Further, a case where a roadside apparatus 40 is installed at a roadside of the road 110 is exemplified.

In the embodiments, in an intersection of the road 110 and road 120, a gate 130 (gate 131 and gate 132) may be installed on the road 110, and a traffic light 140 (traffic light 141 and traffic light 142) may be installed on the road 120.

The vehicle 10 may be a motor car such as motorcycle, motor tricycle, automatic four-wheel vehicle, or the like. The vehicle 10 may be a train. The vehicle 10 performs communication with the roadside apparatus 40 (road-to-vehicle communication). Here, a case where the vehicle 10 is a bus is exemplified. In FIG. 1, as the vehicle 10, a vehicle 10A, vehicle 10B and vehicle 10C are exemplified. The vehicle 10A is an example of a towing vehicle towing one or more towed vehicles. The vehicle 10B and vehicle 10C are an example of the one or more towed vehicles towed by the towing vehicle. A towing scheme may be a physical towing scheme which the vehicle 10 is connected by a cable or the like, or an electronic towing scheme which the vehicle 10 is towed by a radar, communication, or the like. In such the towing, communication between the vehicles 10 (vehicle-to-vehicle communication) may be performed, to maintain the towing properly. Details of the vehicle 10 will be described later (refer to FIG. 2).

The vehicle 20 may be a motor car such as motorcycle, motor tricycle, automatic four-wheel vehicle, or the like. Here, a case where the vehicle 20 is a passenger car is exemplified. The vehicle 20 may perform communication with the roadside apparatus 40 (road-to-vehicle communication). The vehicle 20 may perform communication with another vehicle (vehicle-to-vehicle communication).

The roadside apparatus 40 performs communication with the vehicle 10 (road-to-vehicle communication). The roadside apparatus 40 may perform the communication with the vehicle 20 (road-to-vehicle communication). The roadside apparatus 40 may have a function performing communication with the gate 130. The roadside apparatus 40 may have a function performing communication with the traffic light 140. The above vehicle-to-vehicle communication may perform by a timing when the road-to-vehicle communication is not performed. Details of the roadside apparatus 40 will be described later (refer to FIG. 3).

The road 110 is a way for the vehicle 10. The road 110 may be a motor vehicle road or railroad. The road 110 may be an exclusive road of the vehicle 10 on which entering of vehicle 20 is restricted.

The road 120 is a way for the vehicle 20. The road 120 may be a motor vehicle road. The road 120 may be a road on which entering of the vehicle 10 is permitted.

The gate 130 is a gate for restricting entering of the vehicle 20 to the road 110. The gate 130 is configured to close when the vehicle 10 does not pass through an intersection and open when the vehicle 10 passes through the intersection. For example, the gate 130 may open or close according to an operation schedule of the vehicle 10. The gate 130 may open according to approach of the vehicle 10 to the intersection, and close according to leaving of the vehicle 10 from the intersection. The approach and leaving of the vehicle 10 may be notified from the roadside apparatus 40 to the gate 130 after being detected by the roadside apparatus 40 based on whether or not a message can be received from the vehicle 10.

The traffic light 140 is configured to display a signal indicating whether or not passage of the intersection of the vehicle 20 is permitted (for example, blue signal, yellow signal, red signal). The traffic light 140 may be configured to display a blinking signal to attract attention to the vehicle 20. For example, the traffic light 140 may switch the signal according to a predetermined schedule. The gate 130 may switch the signal according to the approach of the vehicle 10 to the intersection and leaving of the vehicle 10 from the intersection. The approach and leaving of the vehicle 10 may by notified from the roadside apparatus 40 to the traffic light 140 after being detected by the roadside apparatus 40 based on whether or not a message can be received from the vehicle 10.

(Vehicle)

Figure 2:
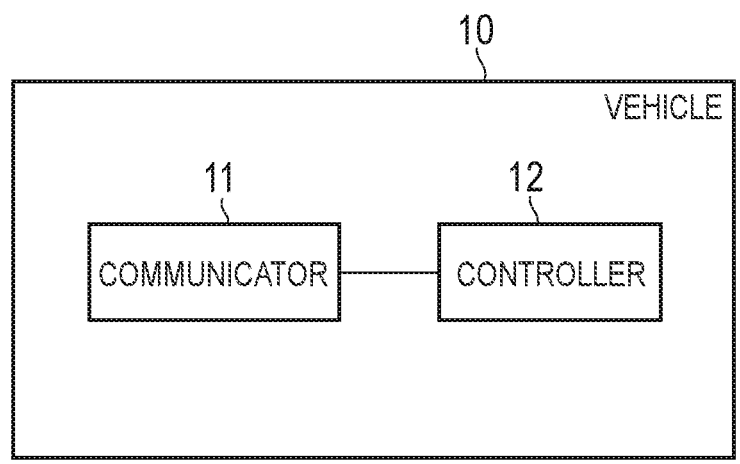
FIG. 2 is a diagram illustrating a vehicle 10 according to an embodiment.

In the following, it will be described about a vehicle according to the embodiment. Here, as the vehicle, the vehicle 10 is exemplified. As illustrated in FIG. 2, the vehicle 10 includes a communicator 11 and controller 12.

The communicator 11 is configured by a radio communication module. The communicator 11 may have a function of determining an empty state of a frequency of radio waves (for example, 700 MHz band) by performing a carrier sense. The communicator 11 transmits a packet at a timing when the frequency of the radio waves is empty. One message may be configured by one or more packets.

The communicator 11 may perform road-to-vehicle communication, or vehicle-to-vehicle communication. The packet includes identification information using for identification of a source, synchronization information indicating a synchronization method to the roadside apparatus 40, transmission time of the packet, period information indicating a period of the road-to-vehicle communication (a number of transfers of the road-to-vehicle communication, a road-to-vehicle communication period length), or the like. The vehicle-to-vehicle communication may include communication occurring with the road-to-vehicle communication (packet transfer), or include communication for maintaining a tow properly (communication for maintaining distance between the vehicles, or the like).

In the following, in view of the above message, it will be described about details of the message.

The communicator 11 transmits a message including an information element indicating whether or not one or more towed vehicles are towed by a towing vehicle. For example, the information element may be a one-bit flag indicating presence or absence of a tow.

The communicator 11 may transmit a message including an information element indicating whether or not the one or more towed vehicles are towed, when the vehicle 10 is the towing vehicle. For example, the information element may be a one-bit flag indicating whether or not the vehicle 10 is the towing vehicle. Or the communicator 11 may transmit a message including an information element indicating whether or not being towed by the towing vehicle, when the vehicle 10 is the towed vehicle. For example, the information element may be a one-bit flag whether or not the vehicle 10 is the towed vehicle. Or the information element may be a one-bit flag indicating whether the vehicle 10 is the towing vehicle or the towed vehicle.

The communicator 11 may be transmit a message including an information element representing a length of a convoy of vehicles including the towing vehicle and towed vehicle, when the one or more towed vehicles are towed by the toeing vehicle. The length of the convoy of vehicles may be represented by a number of the vehicles 10 configuring the convoy of vehicles, a physical length of the convoy of vehicles, or a predetermined index according to the length of the convoy of vehicles.

The communicator 11 may transmit a message including an information element indicating how many vehicles from a lead vehicle in the convoy of vehicles including the towing vehicle and towed vehicle the own vehicle 10 is, when the one or more towed vehicles are towed by the towing vehicle. The information element may be represented by ooth vehicle from the lead vehicle, or oo/xx. However, xx is a number of the vehicles 10 configuring the convoy of vehicles.

The communicator 11 may transmit a message including an information element indicating a towing scheme, when the one or more towed vehicles are towed by the towing vehicle. As described above, the towing scheme may a towing scheme that the vehicle 10 is connected physically, or a towing scheme that the vehicle 10 is connected electronically.

The controller 12 is configured by a control circuit including a memory, CPU, or the like. The controller 12 controls the communicator 11 at least. For example, the controller 12 controls the communicator 11 such that the message including the above described information element is transmitted, when the one or more towed vehicles are towed by the towing vehicle.

In the embodiments, the message may be transmitted by a broadcast. In such the case, the message may include an information element identifying another party or may not the information element identifying the other party.

(Roadside Apparatus)

Figure 3:
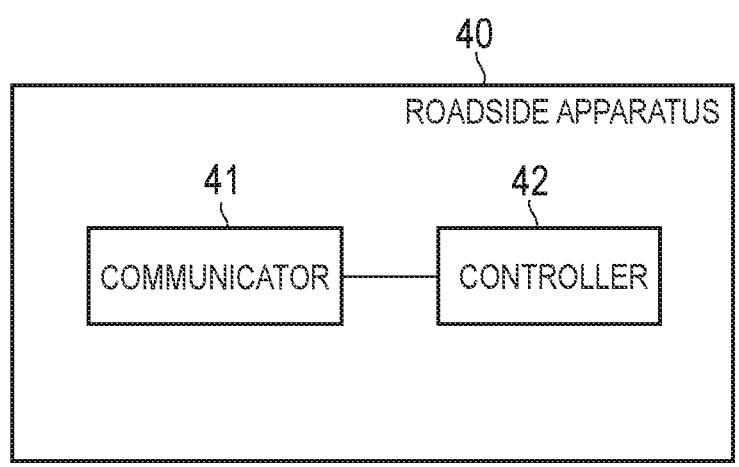
FIG. 3 is a diagram illustrating a roadside apparatus 40 according an embodiment.

In the following, it will be described about a roadside apparatus according to the embodiments. As illustrated in FIG. 3, the roadside apparatus 40 includes a communicator 41 and controller 42.

A radio communication scheme of the roadside apparatus 40 may conform to ARIB T109, V2X (Vehicle to Everything) defined by 3GPP (3rd Generation Partnership Project), or a scheme such as a wireless LAN or the like. The roadside apparatus 40 may be an all-in-type possible to correspond to all these communication standards.

The communicator 41 is configured by a radio communication module. The communicator 41 may not have a function of determining an empty state of a frequency of radio waves (for example, 700 MHz band) by performing a carrier sense. The communicator 41 transmits a packet at a timing determined by the controller 42. One message may be configured by one or more packets.

The communicator 41 may perform road-to-vehicle communication. The packet includes identification information using for identification of a source, synchronization information indicating a synchronization method to the roadside apparatus 40, transmission time of the packet, period information indicating a period of the road-to-vehicle communication (a number of transfers of the road-to-vehicle communication, a road-to-vehicle communication period length), or the like.

The communicator 41 receives a message including an information element indicating whether or not the one or more towed vehicles are towed by the towing vehicle. The communicator 41 may receive a message including an information element indicating whether the vehicle 10 is the towing vehicle or the towed vehicle. The communicator 41 may receive a message including an information element representing a length of a convoy of vehicles including the towing vehicle and towed vehicle. The communicator 41 may receive a message including an information element indicating how many vehicles from a lead vehicle the vehicle 10 is. The communicator 41 may receive a message including an information element indicating a towing scheme.

The controller 42 is configured by a control circuit including a memory, CPU, or the like. The controller 42 controls the communicator 41 at least. For example, the controller 42 may control the communicator 41 such that the road-to-vehicle communication is performed in a first transmission time, in a state that the vehicle 10 (towing vehicle and/or towed vehicle) does not approach. On the other hand, the controller 42 may control the communicator 41 such that the road-to-vehicle communication is performed in a second transmission time shorter than the first transmission time, in a state that the vehicle 10 (towing vehicle and/or towed vehicle) is approaching.

The controller 42 may control an open and close of the gate 130 based on whether or not the vehicle 10 (towing vehicle and/or towed vehicle) is approaching. In such the case, the controller 42 may transmit, to the gate 130, a control command instructing the open and close of the gate 130. Such the communication may be performed by wire or radio. The controller 42 may control the open and close of the gate 130 considering to a length of a convoy of vehicles based on the information element included in the message.

The controller 42 may control switching of a signal displayed by the traffic light 140 based on whether or not the vehicle 10 (towing vehicle and/or towed vehicle) is approaching. In such the case, the controller 42 may transmit, to the traffic light 140, a control command instructing switching of the signal displayed by the traffic light 140. Such the communication may be performed by wire or radio. The controller 42 may switch the signal displayed by the traffic light 140 considering the length of the convoy of vehicles based on the information element included in the message.

(Road-To-Vehicle Communication)

In the following, it will be described about road-to-vehicle communication according to the embodiments. As illustrated in FIG. 4, the road-to-vehicle communication is performed with a control unit time (for example, 16 μm) as a minimum unit, in a control cycle (for example, 100 ms). Upper limit of the number of times that the roadside apparatus 40 can transmit a packet in the control cycle (for example, N=16 times) is predetermined. One transmission period is variable, upper limit of the one transmission period (for example, 3024 μs) is predetermined.

On the basis of such the case, the roadside apparatus 40 performs the road-to-vehicle communication in a first transmission time. The first transmission time is defined by one transmission period length and the number of transmission times in the control cycle. Here, the roadside apparatus 40 may perform the road-to-vehicle communication in a second transmission time shorter than the first transmission time, in a state that the vehicle 10 (towing vehicle and/or towed vehicle) is approaching. The second transmission time may be configured such that transmission period length is shorter than a transmission period length of the first transmission time, or such that the number of transmission times is smaller than the number of transmission times of the first transmission time.

(Transport Communication Method)

In the following, it will be described about a transport communication method according to the embodiments. Here, the vehicle 10 configures a convoy of vehicles including the towing and towed vehicles.

As illustrated in FIG. 5, in Step S10, the vehicle 10 performs communication of a message for maintaining a tow properly (vehicle-to-vehicle communication). Such the vehicle-to-vehicle communication is performed continuously.

In Step S20, the roadside apparatus 40 transmits a message in a first transmission time (road-to-vehicle communication). Concretely, the roadside apparatus 40 transmits a packet of the road-to-vehicle communication in the first transmission time at each of a control cycle.

In Step S30, the vehicle 10 transmits a message including an information element indicating whether or not the one or more towed vehicles are towed by the towing vehicle. As described above, the message may include an information element indicating whether the vehicle 10 is the towing vehicle or the towed vehicle, an information element representing a length of a convoy of vehicles including the towing vehicle and towed vehicle, an information element indicating how many vehicles from a lead vehicle the vehicle 10 is, or an information element indicating a towing scheme.

Here, the vehicle 10 may transmit the above message when the vehicle 10 receives the packet from the roadside apparatus 40. Namely, the vehicle 10 may transmit the above message in a state that the vehicle 10 approaches to the roadside apparatus 30. The vehicle 10 may transmit the message at each of the transmission cycle repeatedly.

In Step S40, the roadside apparatus 40 determines whether or not the vehicle 10 configures the convoy of vehicles including the towing vehicle and towed vehicle. Here, the description will be continued about a case where the vehicle 10 configures the convoy of vehicles including the towing vehicle and towed vehicle. Namely, the roadside apparatus 40 detects approach of the convoy of vehicles including the towing vehicle and towed vehicle based on the information element indicating whether or not the one or more towed vehicles are towed by the towing vehicle.

In Step S50, the roadside apparatus 40 transmits a message in a second transmission time (road-to-vehicle communication). Concretely, the roadside apparatus 40 transmits a packet of the road-to-vehicle communication in the second transmission time at each of the control cycle. As described above, the second transmission time may be configured such that the transmission period length is shorter than a transmission period length of the first transmission time, or that the number of the transmission times is smaller than the number of transmission times of the first transmission time.

In this way, the roadside apparatus 40 detects the approach of the convoy of vehicles including the towing vehicle and towed vehicle based on the information element indicating whether or not the one or more towed vehicles are towed by the towing vehicle, and changes transmission time of the packet of the road-to-vehicle communication at each of the control cycle.

In the sequence illustrated in FIG. 5, though a case where the process of S30 is performed after the process of S20 is exemplified, the sequence is not limited to this. The process of S30 may be performed before or after the process of S20. Namely, the vehicle 10 may transmit the message repeatedly at each of the control cycle regardless of whether or not approaching to the roadside apparatus 40.

(Operation and Effect)

In the embodiments, the message including the information element indicating whether or not the one or more towed vehicles are towed by the towing vehicle is transmitted from the vehicle 10 to the roadside apparatus 40. Such the configuration, the roadside apparatus 30 can identify the convoy of vehicles including the towing vehicle and towed vehicle.

For example, the roadside apparatus 40 detects the approach of the convoy of vehicles including the towing vehicle and towed vehicle based on the information element indicating whether or not the one or more towed vehicles are towed by the towing vehicle, and changes transmission time of the packet of the road-to-vehicle communication at each of the control cycle. Such the configuration, it is possible to secure transmission time of communication between the towing vehicle and towed vehicle and/or communication between the towed vehicle and towed vehicle (vehicle-to-vehicle communication) and suppress influence that the road-to-vehicle communication exerts to the vehicle-to-vehicle communication.

Or the roadside apparatus 40 can identify another party of a control message which controls operation of the vehicle 10 (towing vehicle) based on the information element indicating whether the vehicle 10 is the towing vehicle or the towed vehicle. Such the configuration, the roadside apparatus 40 can perform transmission of the control message when the towing vehicle is inside of a communication area, and stop transmission of the control message when the towing vehicle is outside of the communication area. Namely, it is possible to utilize a radio resource effectively.

Or the roadside apparatus 40 can identify a length of a convoy of vehicles based on the information element indicating the length of the convoy of vehicles including the towing vehicle and towed vehicle. Such the configuration, the roadside apparatus 40 can estimate a time when a convoy of vehicle passes through an intersection, for example, control properly at least any one of the gate 130 and traffic light 140. Further, the roadside apparatus 40 can improve estimation accuracy of time when the convoy of vehicles passes through the intersection based on the information element indicating how many vehicles from the lead vehicle the vehicle 10 is.

The above operation of the roadside apparatus 40 is merely one example, in the embodiment, the roadside apparatus 40 needs only to be able to perform control causing to run properly the convoy of vehicles including the towing vehicle and towed vehicle, by notifying information regarding to the convoy of vehicles including the towing vehicle and towed vehicle.

Other Embodiments

Though the present invention is described by the above embodiments, the description and drawings being a part of disclosure should not be understood to limit the present invention. By this disclosure, various alternative embodiments, examples, and operating techniques will become apparent for a person with an ordinary skill in the art.

Though it is not described specifically in the embodiments, the roadside apparatus 40 may perform communication with another roadside apparatus (road-road communication).

In the embodiments, though the vehicle 10 and roadside apparatus 30 are described mainly, the embodiments should not be limited to this. A communication apparatus installed in at least any one of the vehicle and roadside apparatus 40 may be provided. The communication apparatus has a function of the communicator 11 and a function of the communicator 41.

This application claims priority to Japanese Patent Application No. 2018-122516 (filed on Jun. 27, 2018), which is incorporated by reference herein in their entity.

The invention claimed is:

1. A vehicle that performs communication with a roadside apparatus installed in a roadside of a road at least, the vehicle comprising:
   a communicator configured to transmit, to the roadside apparatus, a message including an information element indicating whether or not one or more towed vehicles are towed by a towing vehicle, and
   a controller configured to control the communicator such that the message is transmitted.

2. The vehicle according to claim 1, wherein
   the communicator is configured to transmit a message including an information element indicating whether or not the one or more towed vehicles are towed, when the vehicle is the towing vehicle.

3. The vehicle according to claim 1, wherein
   the communicator is configured to transmit a message including an information element indicating where or not being towed by the towing vehicle, when the vehicle is the one or more towed vehicles.

4. The vehicle according to claim 1, wherein
   the communicator is configured to transmit a message including an information element representing a length of a convoy of vehicles including the towing vehicle and the one or more towed vehicles, when the one or more towed vehicles are towed by the towing vehicle.

5. The vehicle according to claim 1, wherein
   the communicator is configured to transmit a message including an information element indicating how many vehicles in a convoy of vehicles including the towing vehicle and one or more towed vehicles the vehicle is, when the one or more towed vehicles are towed by the towing vehicle.

6. The vehicle according to claim 1, wherein the communicator is configured to transmit a message including an information element indicating a towing scheme, when the one or more towed vehicles are towed by the towing vehicle.

7. A roadside apparatus installed in a roadside of a road, the apparatus comprising:
a communicator configured to receive, from a vehicle, a message including an information element indicating whether or not one or more towed vehicles are towed by a towing vehicle, and
a controller configured to control the communicator.

8. The roadside apparatus according to claim 7, wherein approach of a convoy of vehicles including the towing vehicle and towed vehicle is detected based on the information element, and transmission time of a packet of road-to-vehicle communication between the roadside apparatus and vehicle is changed.

9. A transport communication system comprising:
a roadside apparatus installed in a roadside of a road; and
a vehicle which performs communication with the roadside apparatus at least, wherein
the vehicle includes a communicator configured to transmit, to the roadside apparatus, a message including an information element indicating whether or not one or more towed vehicles are towed by a towing vehicle.

\* \* \* \* \*